(12) United States Patent
Miyashita

(10) Patent No.: US 6,732,505 B2
(45) Date of Patent: May 11, 2004

(54) IN-CYLINDER INJECTION TYPE SPARK-IGNITION INTERNAL COMBUSTION ENGINE AND METHOD

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/211,575

(22) Filed: Aug. 5, 2002

(65) Prior Publication Data
US 2002/0184878 A1 Dec. 12, 2002

Related U.S. Application Data

(62) Division of application No. 09/887,019, filed on Jun. 25, 2001.

(30) Foreign Application Priority Data

Jun. 28, 2000 (JP) ........................................ 2000-200116

(51) Int. Cl.[7] .................................................. F01N 3/00
(52) U.S. Cl. ............................ 60/284; 60/274; 60/285; 123/198 F; 123/481
(58) Field of Search .......................... 60/274, 284, 285, 60/295, 300; 123/198 F, 481, 491, 676

(56) References Cited

U.S. PATENT DOCUMENTS

| | | | |
|---|---|---|---|
| 4,134,261 A | | 1/1979 | Iizuka et al. |
| 4,150,651 A | * | 4/1979 | Wade et al. ............. 123/198 F |
| 4,165,610 A | | 8/1979 | Iizuka et al. |
| 4,274,373 A | | 6/1981 | Sugasawa et al. |
| 4,393,825 A | * | 7/1983 | Breek et al. ............. 123/198 F |
| 5,481,461 A | | 1/1996 | Miyamoto et al. |
| 5,653,102 A | | 8/1997 | Orzel et al. |
| 5,809,973 A | | 9/1998 | Iida et al. |
| 5,890,467 A | * | 4/1999 | Romzek ..................... 123/491 |
| 5,975,046 A | | 11/1999 | Kaneko et al. |
| 6,023,929 A | | 2/2000 | Ma ............................. 60/295 |
| 6,164,065 A | | 12/2000 | Denari et al. |
| 6,205,776 B1 | | 3/2001 | Otsuka |
| 6,415,601 B1 | * | 7/2002 | Glugla et al. ................. 60/284 |

FOREIGN PATENT DOCUMENTS

| | | |
|---|---|---|
| EP | 0 826 869 A2 | 3/1998 |
| EP | 0 826 869 A2 | 4/1998 |
| JP | A-11-229926 | 8/1999 |
| JP | A-2000-80942 | 3/2000 |

* cited by examiner

Primary Examiner—Thomas Denion
Assistant Examiner—Tu M. Nguyen
(74) Attorney, Agent, or Firm—Oliff & Berridge, PLC

(57) ABSTRACT

In an in-cylinder injection spark-ignition internal combustion engine including a plurality of cylinders and a catalyst device disposed in an exhaust system of the engine, a fuel is injected to at least one selected cylinder selected from the plurality of cylinders to be operated, and subsequently the fuel is injected to all cylinders to be operated. At this time, a warm-up controlled variable for the at least one selected cylinder is smaller than the warm-up controlled variable used when all cylinders are operated. In the in-cylinder injection spark-ignition internal combustion engine, the all cylinder operation is started and the warm-up control is started for all cylinders to warm up the catalyst device disposed in the exhaust system of the engine preferably when a fuel injection pressure exceeds a target value.

10 Claims, 5 Drawing Sheets

IN-CYLINDER INJECTION TYPE SPARK-IGNITION INTERNAL COMBUSTION ENGINE AND METHOD

INCORPORATION BY REFERENCE

The disclosure of Japanese Patent Application No. 2000-200116 filed on Jun. 28, 2000 including the specification, drawings and abstract is incorporated herein by reference in its entirety.

BACKGROUND OF THE INVENTION

1. Field of Invention

The invention relates to an in-cylinder injection type spark-ignition internal combustion engine and method of operating same.

2. Description of Related Art

There is a known in-cylinder injection type spark-ignition internal combustion engine, in which a fuel is injected directly into each cylinder of the engine during a latter half of a compression stroke. This may provide a fine combustible air-fuel mixture concentrated around a spark plug, which allows a stratified charge combustion that assures combustion of the air-fuel mixture within the cylinder while keeping an overall air-fuel ratio of the air-fuel mixture lean. In such an in-cylinder injection type spark-ignition internal combustion engine, each of the cylinders is provided with a fuel injection valve for injecting a highly pressurized fuel stored in an accumulator into the cylinder. This arrangement makes it possible to inject the fuel into the cylinder at the air pressure increased in the latter half of the compression stroke.

The fuel stored in the accumulator is pressurized by a high-pressure pump driven by the engine. However, the high-pressure pump does not operate sufficiently at the engine start-up, resulting in insufficient pressurization of the fuel in the accumulator. Generally, the in-cylinder injection type spark-ignition internal combustion engine is arranged to inject the fuel into each cylinder during an intake stroke so as to conduct a uniform combustion at the engine start-up. Since the air pressure in the cylinder during the intake stroke is lower than that during the latter half of the compression stroke, this arrangement is favorable for the fuel injection. However, the fuel pressure in the accumulator at the engine start-up is too low to successively inject an increased amount of the fuel required at the engine start-up into the cylinders. As a result, the required amount of the fuel cannot be injected to each of the cylinders, causing misfire and failing to realize the desired engine start-up.

JP-A-11-229926 discloses an in-cylinder injection type spark-ignition internal combustion engine in which the fuel injection is performed only to at least a selected cylinder at the engine start-up so as to be operated until the engine start-up is completed. According to this type of the combustion engine, the required amount of the fuel may be injected into the selected cylinder for complete combustion, resulting in good engine start-up.

Upon starting the engine, it is generally required to warm up and activate a catalyst device disposed in the engine exhaust system as early and quickly as possible. To cope with the aforementioned requirement, an exhaust gas temperature is increased by retarding the ignition timing. However, the foregoing warm-up control may deteriorate the combustion condition. When operating the selected cylinder to start the engine, the resultant output generated by the cylinder may be decreased. The small increase in the engine speed may deteriorate the engine start-up performance.

SUMMARY OF THE INVENTION

It is therefore an object of the invention to provide an in-cylinder injection type spark-ignition internal combustion engine and method of operating same which makes it possible to perform favorable engine start-up, and to warm up the catalyst device in the engine exhaust system without decreasing the engine output.

To accomplish the above and/or other objects, a first aspect of the invention provides an in-cylinder injection spark-ignition internal combustion engine including a plurality of cylinders and a catalyst device disposed in an exhaust system of the engine, in which a fuel is injected to at least one selected cylinder selected from the plurality of cylinders to be operated, and subsequently the fuel is injected to all cylinders to be operated. A variable of warm-up control to the catalyst device for the selected cylinder is smaller than that used when all cylinders are operated. In the engine according to the first aspect of the invention, the warm-up control of the catalyst device in the engine exhaust system is conducted at the engine start-up at a relatively earlier stage. Further, the warm-up controlled variable is kept to a small value during operation of the selected cylinder. This is effective to restrict the decrease in the engine output, thus providing favorable start-up of the engine.

In an in-cylinder injection spark-ignition internal combustion engine including a plurality of cylinders and a catalyst device disposed in an exhaust system of the engine, a fuel is injected to at least one selected cylinder selected from the plurality of cylinders to be operated, and subsequently the fuel is injected to all cylinders to be operated. According to a second aspect of the invention, the all cylinder operation is started and the warm-up control is started for all cylinders to warm up the catalyst device disposed in the exhaust system of the engine when a fuel injection pressure exceeds a target value. In the engine according to the second aspect of the invention, the warm-up control of the catalyst device in the engine exhaust system is not conducted during operation of the selected cylinder. This is effective to restrict the decrease in the engine output, thus providing favorable start-up of the engine. Additionally, this may realize reliable fuel injection at a high pressure while operating all cylinders with a reduced discharge amount of harmful materials.

BRIEF DESCRIPTION OF THE DRAWINGS

The foregoing and/or other objects, features and advantages of the invention will become more apparent from the following description of preferred embodiments with reference to the accompanying drawings in which like reference numerals designate like elements and wherein.

DETAILED DESCRIPTION OF PREFERRED EMBODIMENTS

Figure 1:
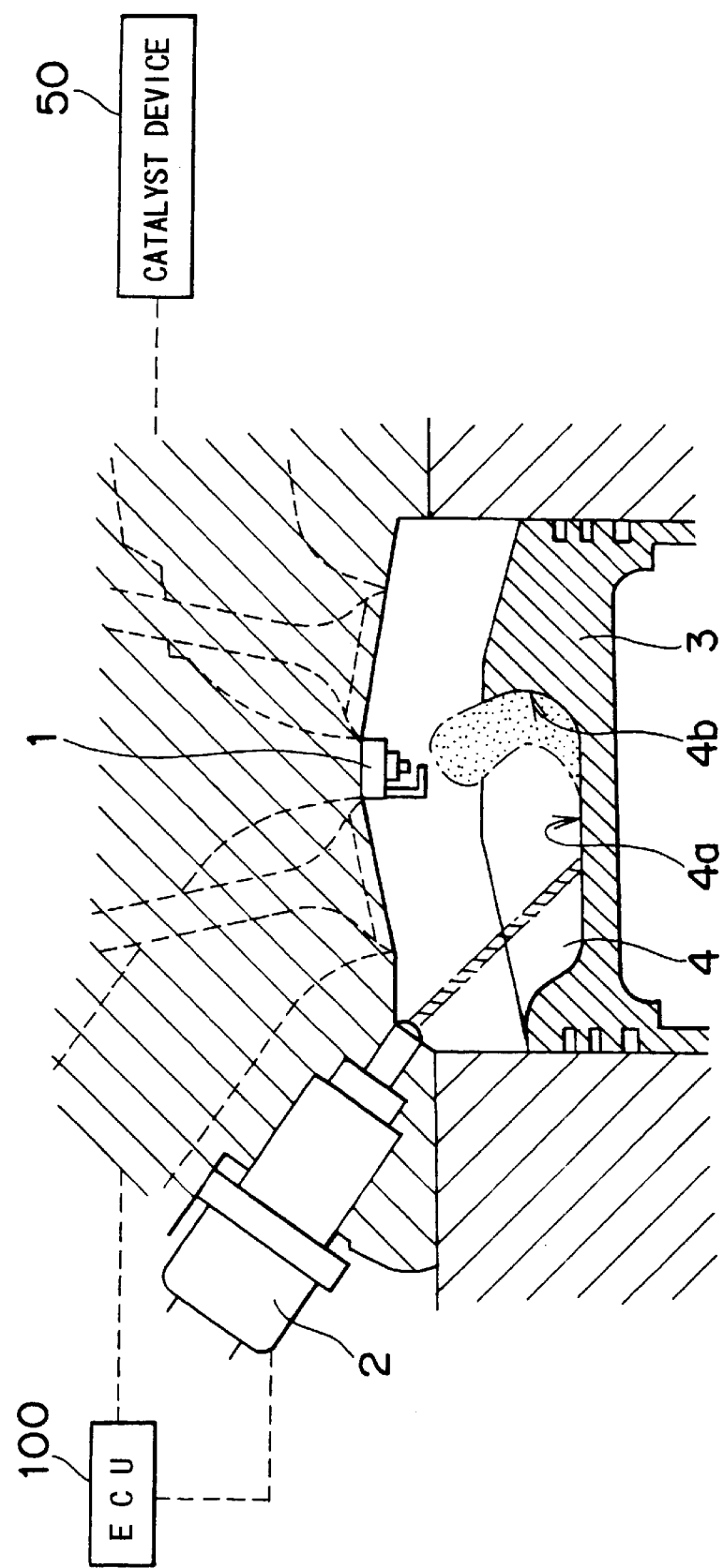
FIG. 1 is a schematic view in a longitudinal section of an engine cylinder of an in-cylinder injection type spark-ignition internal combustion engine constructed according to one preferred embodiment of the present invention.
Figure 2:
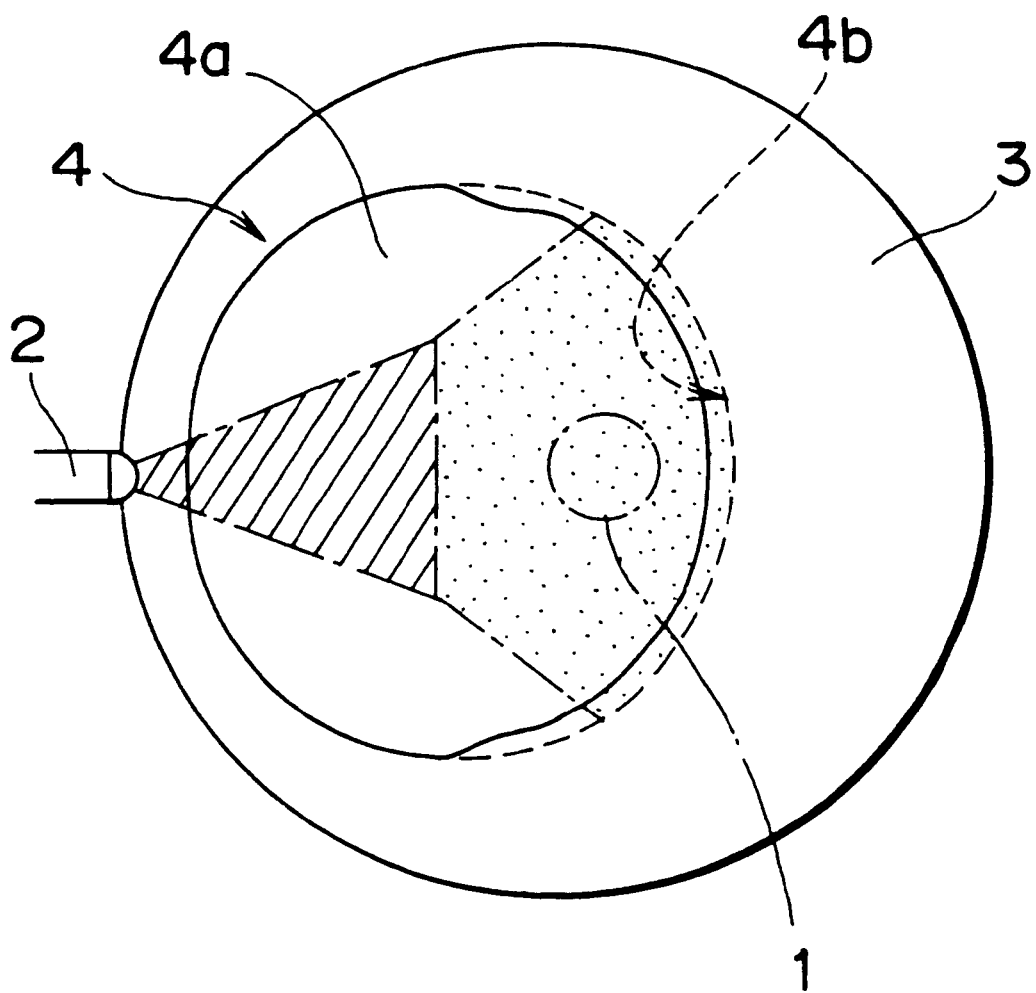
FIG. 2 is a top plan view of a piston of FIG. 1.

FIG. 1 is a schematic view in a longitudinal section of one of a plurality of cylinders for an in-cylinder injection type spark-ignition internal combustion engine constructed according to one preferred embodiment of the invention. FIG. 2 is a top plan view of a piston used in the engine cylinder of FIG. 1. As is apparent from FIGS. 1 and 2, a spark plug 1 is disposed in a substantially central portion of the upper end of the cylinder. A fuel injection valve 2 is disposed in a peripheral portion of the upper end of the cylinder so as to allow direct injection of the fuel into the cylinder. A cavity 4 in the form of a recess is formed in a top face of a piston 3. The fuel injection valve 2 is located on the side of an inlet port at which the temperature is kept relatively low owing to the intake air flowing through the intake port so as to prevent vaporization of the fuel.

The fuel injection valve 2 preferably has a slit-like injection hole such that the fuel injected from the fuel injection valve 2 becomes a spray in a substantially fan-like shape having a relatively small thickness. Referring to FIG. 1, the stratified charge combustion is accomplished by injecting the fuel into the cavity 4 formed in the top face of the piston 3 during the latter half of the compression stroke. The injected fuel in the liquid state is vaporized as it flows along and spreads widely over a bottom face 4a of the cavity to absorb heat from the wide range thereof. The thus vaporized fuel flows upward along a sidewall 4b.

As is apparent from FIG. 2, the sidewall 4b has an arcuate shape as in the top plan view of the piston 3. The vaporizing fuel flowing upward along the sidewall 4b further absorbs heat therefrom, and is vaporized completely. The arcuate sidewall 4b is effective to concentrate the vaporized fuel in the diametrically central portion of the cylinder, providing a mass of combustible air-fuel mixture in the vicinity of the spark plug 1. The thus formed combustible air-fuel mixture is ignited for conducting the stratified charge combustion.

In the in-cylinder injection spark-ignition internal combustion engine of the present embodiment, a uniform combustion is conducted as well as the stratified charge combustion. The uniform combustion is realized by injecting the fuel into the cylinder during an intake stroke so as to fill the inside of the cylinder with an air-fuel mixture at a stoichiometric ratio upon ignition timing. Unlike the stratified charge combustion in which the fuel injection timing is limited to the latter half of the compression stroke, the uniform combustion allows injection of a large amount of the fuel, and can be conducted at high-speed and high-load condition of the engine.

Meanwhile, the fuel injection valve 2 is connected to an accumulator for storing the highly pressurized fuel such that the fuel can be delivered into the highly pressurized cylinder at the latter half of the compression stroke. In general, the pressure of the fuel stored in the accumulator is increased using a high-pressure pump driven by the engine. Accordingly, the operation of the high-pressure pump cannot be operated satisfactorily at the engine start-up, leading to insufficient increase in the pressure of the fuel in the accumulator.

In the in-cylinder injection spark-ignition internal combustion engine constructed according to the present embodiment, the engine is operated to conduct the uniform combustion that allows injection of the fuel at a relatively low pressure at the engine start-up. However, as the pressure of the fuel in the accumulator is significantly low at the engine start-up, it is difficult to successively deliver a sufficient amount of the fuel into the respective cylinders even in the uniform combustion. If the uniform combustion is conducted in the aforementioned state of the engine, a misfire may occur in some of the cylinders due to insufficient fuel supply. As a result, a large amount of unburned fuel components is discharged from the cylinders. In addition, the rest of the cylinders in which the uniform combustion is conducted fail to output sufficient power due to insufficient fuel supply. This makes it difficult to realize a desired engine start-up.

According to the in-cylinder injection spark-ignition internal combustion engine of the present embodiment, the fuel is delivered only to at least one selected cylinder (e.g., half of the cylinders, the ignition timings of which are not sequential) at the engine start-up so as to start the engine by operating the selected cylinder(s). As described above, the required amount of the fuel can be injected only to the selected cylinder(s) at the engine start-up. This makes it possible to conduct good combustion without causing the misfire owing to insufficient fuel supply thereto.

Upon start of the engine, it is generally required to warm up and activate a catalyst device 50 disposed in an exhaust system of the engine at an early stage such that the exhaust gas containing harmful materials is purified. Therefore, the internal combustion engine of the invention is arranged to perform a warm-up control for the catalyst device 50 at its start-up. The warm-up control for the catalyst device 50 is performed to prevent the decrease in the cylinder temperature owing to the fuel injection and to conduct the fuel combustion completely. Such control is executed by, for example, retarding an ignition timing to increase the exhaust gas temperature, or by controlling the air-fuel ratio of the mixture to be leaner than the theoretical air-fuel ratio.

The above-described warm-up control for the catalyst device 50 may deteriorate the combustion to a certain degree. When executing the aforementioned warm-up control during operation of the selected cylinder(s), the engine output generated thereby is lowered. The increase rate of the engine speed, thus, is relatively small, which makes it impossible to realize good engine start-up.

Figure 3:
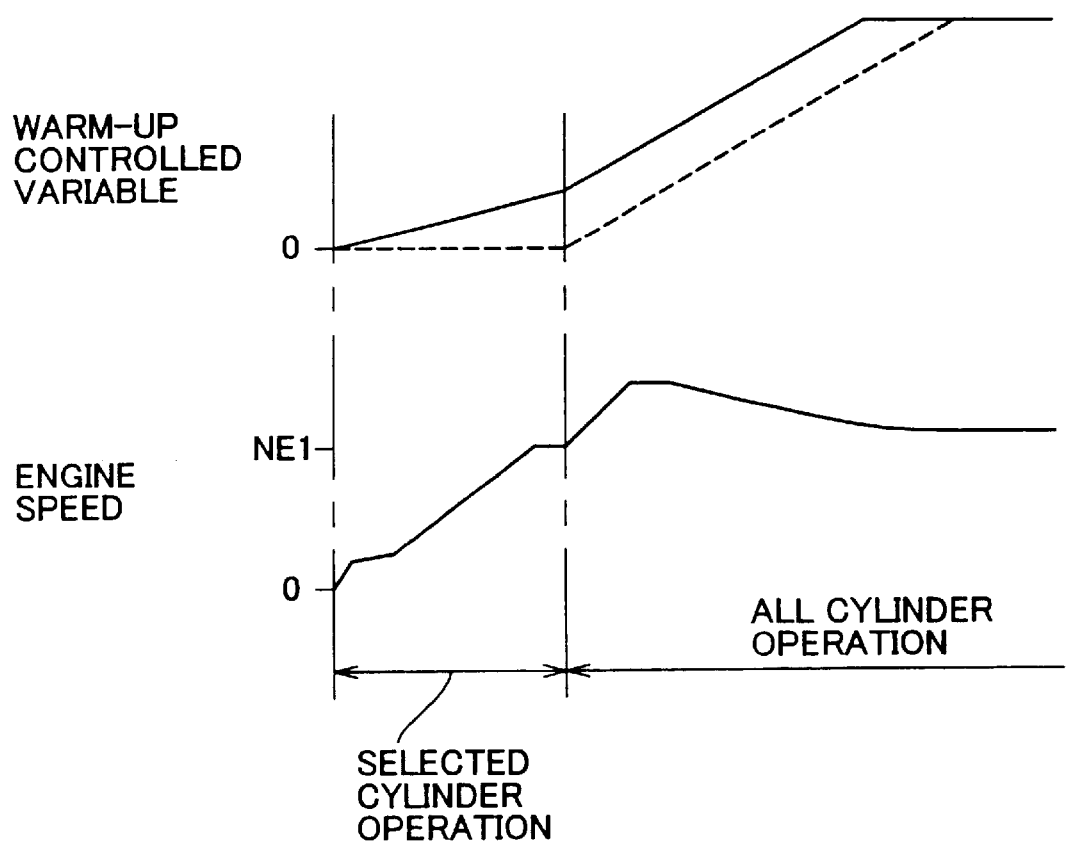
FIG. 3 is a timing chart for illustrating a change of a warm-up controlled variable according to one example of control patterns for warming up a catalyst device.

To solve this problem, the internal combustion engine of the present embodiment may be arranged to execute the warm-up control during operation of the selected cylinder(s) upon the engine start-up according to a warm-up control pattern as shown in the graph of FIG. 3. In this control pattern, a warm-up controlled variable for the selected cylinder is gently increased from zero until the actual engine speed reaches a target engine speed NE1. The target engine speed NE1 indicates the completion of the engine start-up, from when the fuel is injected to all the cylinders to be operated. At this time (the time when target engine speed NE1 is reached), the controlled variable is sharply increased to a normal value. It is noted that the warm-up controlled variable represents a retarding degree (amount) in the case where the warm-up control is executed by retarding the ignition timing. Alternatively the warm-up controlled variable may be a fuel-lean level in the case where the warm-up control is executed by controlling the air-fuel ratio of the mixture to a lean level. In this case, the air fuel ratio in rich state at the engine start-up is brought into the lean state as the warm-up controlled variable is increased.

As is understood from the foregoing description, the controlled variable during operation of the selected cylinder(s) is made smaller than its value during operation of all cylinders. This arrangement is effective to prevent the undesirable reduction in the output of the engine during operation of the selected cylinder(s). This may lead to a relatively sharp increase in the engine speed, assuring a desired engine start-up performance.

The broken line of FIG. 3 indicates the change of a controlled variable of the rest of the cylinders, that is, the inoperative cylinders. As is understood from the broken line of FIG. 3, the controlled variable for the inoperative cylinder is increased sharply to the normal value immediately after the start of all cylinder operation. In the all cylinder operation, the number of cylinders to be operated is increased. Even if the engine output is dropped by increasing the warm-up controlled variable, engine stalling or the like can be prevented. As the warm-up control has been started at the engine start-up during operation of the selected cylinder, the catalyst device 50 of the exhaust system of the engine can be activated at a relatively earlier stage.

Compared with the case where the warm-up control has been started at a timing for operating the selected cylinder, the in-cylinder injection spark-ignition internal combustion engine of the present embodiment may be inferior in view of the capacity for warming up the catalyst device. However, the aforementioned problem is negligible during the selected cylinder operation at the engine start-up. This is because the inoperative cylinders serve to decrease a total emission of the exhaust gas and, accordingly, harmful materials. Further, the negative pressure level in the intake manifold is increased by the selected cylinder operation, and the fuel pressure within the accumulator is increased to a higher level. Therefore the fuel injected into each of the cylinders is desirably vaporized under the negative pressure, remarkably reducing the amount of unburned fuel component discharged from the cylinder at the engine start-up. Therefore, in the engine of the invention, the resultant deterioration in the capacity for warming up the catalyst device may be sufficiently compensated.

Figure 4:
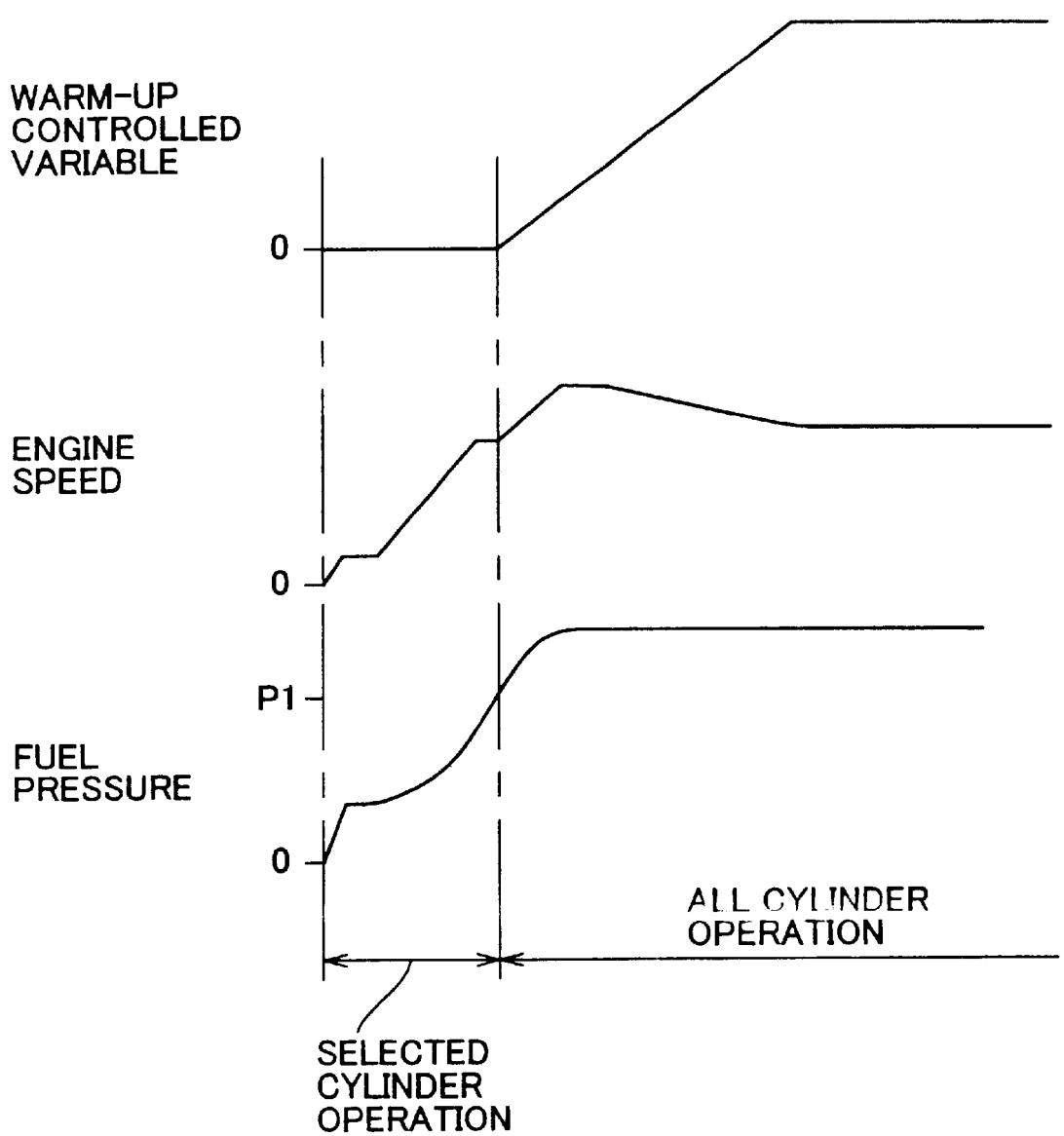
FIG. 4 is a timing chart for illustrating a change of a warm-up controlled variable according to another example of control patterns for warming up the catalyst device.

FIG. 4 shows a graph indicating a change in the warm-up controlled variable of another example of the warm-up control pattern executed in the in-cylinder injection spark-ignition internal combustion engine of the present embodiment. According to this example, the warm-up control is stopped during operation of the selected cylinder. Then the warm-up control is started when the engine operation is switched from the selected cylinder operation to all cylinder operation. As shown by the graph of FIG. 4, the warm-up controlled variable for all cylinders is sharply increased at a greater rate. This may eliminate the drop in the engine output during operation of the selected cylinder. Additionally the sharp rise in the engine speed may further improve the engine start-up performance as compared with the control pattern indicated by the graph shown in FIG. 3.

Referring back to the control pattern illustrating the change of the controlled variable as shown in FIG. 3, when the engine speed reaches the target speed NE1, the engine operation is switched from the selected cylinder operation to all cylinder operation. Alternatively, the engine operation may be switched from the selected cylinder operation to all cylinder operation when the engine speed per unit time becomes smaller than a predetermined value as it is considered that no further increase in the engine speed is expected. The engine operation may further be switched when a predetermined period of time or a predetermined number of cycles has elapsed from the start of cranking of the engine as it is considered that the engine start-up has been completed. It is preferable that the negative pressure within the intake manifold be increased to a relatively higher level for operating all cylinders in an excellent condition. Accordingly, the engine operation may be switched when the pressure within the intake manifold reaches a target negative value.

Referring back to the control pattern as shown by the graph of FIG. 4, when the fuel pressure in the accumulator reaches the target pressure P1, the engine operation is switched from the selected cylinder operation to all cylinder operation. This pattern allows a preferable fuel injection into the respective cylinders during all cylinder operation, thus reducing the discharge amount of the harmful materials such as unburned fuel components. Therefore, the invention may activate the catalyst device sufficiently by the warm-up control executed at the operation of all cylinders, and sufficiently reduce the discharged amount of the harmful materials into the atmosphere.

Figure 5:
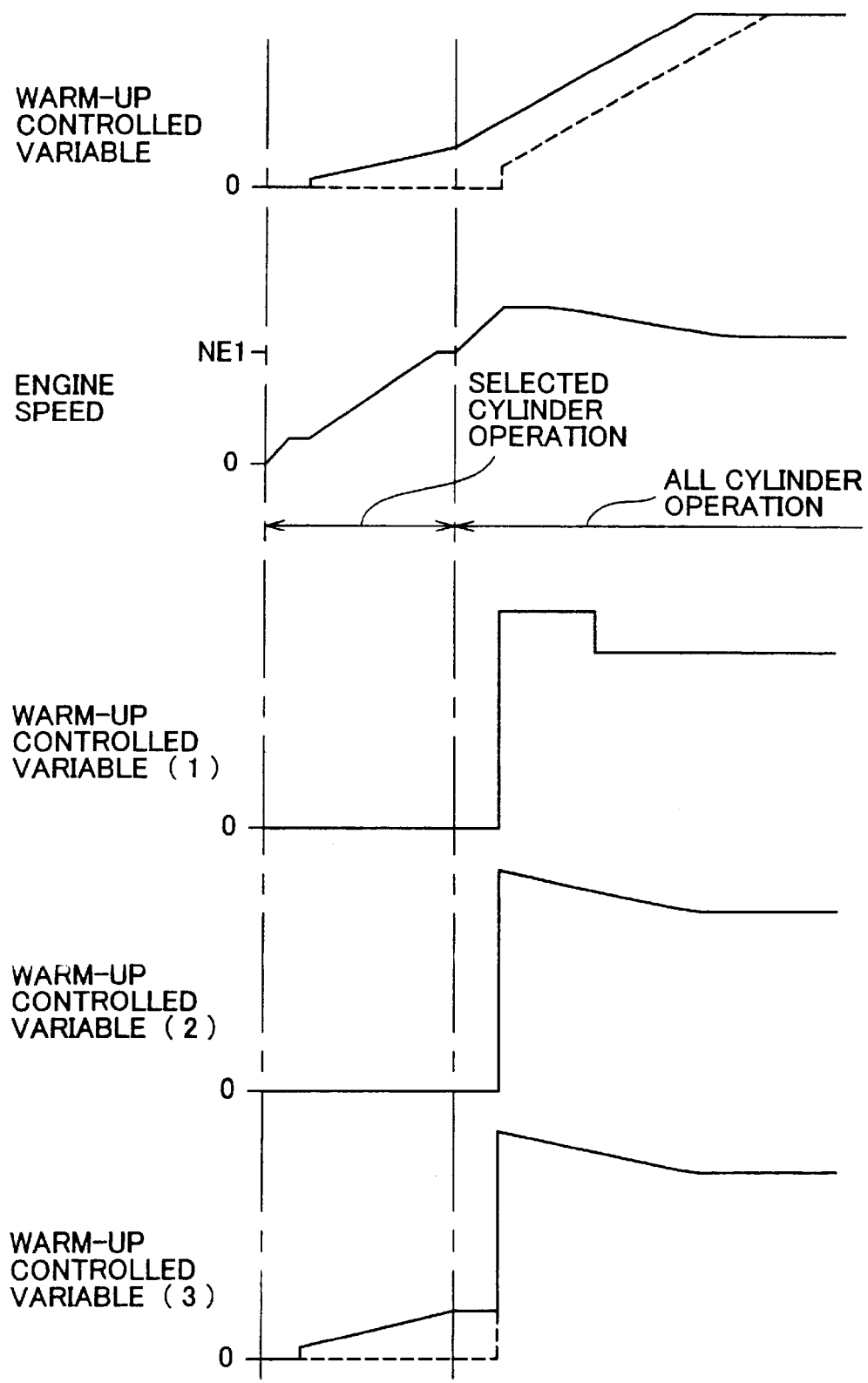
FIG. 5 is a timing chart for illustrating a change of a warm-up controlled variable according to yet another example of control pattern for warming up the catalyst device.

FIG. 5 shows a graph indicating a change of the warm-up controlled variable of yet another example of the warm-up control pattern executed in the in-cylinder injection spark-ignition internal combustion engine of the present embodiment. The warm-up control pattern shown in FIG. 5 is different from the warm-up control pattern shown in FIG. 3 as described below. In the control pattern shown in FIG. 5, the warm-up control during operation of the selected cylinder(s) is started after a predetermined period of time or a predetermined number of cycles has elapsed from the start of cranking of the engine. Further the warm-up control for the non-selected cylinders during operation of all cylinders is started after a predetermined period of time or a predetermined number of cycles has elapsed from the start of all cylinder operation.

In the above case, the warm-up control is stopped during unstable state of initial combustion, which lowers the engine output. As a result, the engine start-up performance may further be improved.

The warm-up control pattern shown in FIG. 5 may be applied to the control pattern shown in FIG. 4. That is, the warm-up control during all cylinder operation may be started after the predetermined term, e.g., a predetermined period of time or a predetermined number of cycles, has elapsed from the start of all cylinder operation. It is noted that retarding the start timing of the warm-up control may improve the engine start-up. On the contrary, however, it may deteriorate the warm-up performance of the catalyst device. Two modifications shown in the graph of FIG. 5 are considered to cope with the aforementioned problem. In each of those modifications, the warm-up controlled variable is sharply increased with respect to all cylinders after completion of initial combustion of all the cylinders. The catalyst device, thus, can be warmed up at the earlier stage.

Referring to the graph of FIG. 5, in the modification (1), the warm-up controlled variable is increased sharply with respect to all cylinders after a predetermined period of time or a predetermined number of cycles has elapsed from the start of all cylinder operation. After keeping the aforementioned state for a predetermined period, the warm-up controlled variable is decreased to the normal value.

In the modification (2), the warm-up controlled variable is increased sharply with respect to all cylinders, and then is gradually decreased to the normal value.

In the modification (3), the warm-up control for the rest of the cylinders is executed in the same way as in the modification (2). The warm-up control for the selected cylinder(s) is started after a predetermined term has elapsed from the start of cranking. The warm-up controlled variable is gently increased during operation of the selected cylinder (s), and is sharply increased, as in the case of the non-selected cylinders, after a predetermined term has elapsed from the start of all cylinder operation.

The in-cylinder injection spark-ignition internal combustion engine of the invention is arranged to conduct uniform combustion during all cylinder operation subsequent to the selected cylinder(s) operation. It may be arranged to conduct stratified charge combustion if the fuel pressure within the accumulator is sufficiently high enough to allow fuel injection at a latter half of the compression stroke when switching the engine operation from the selected cylinder(s) to the all cylinder operation. In the uniform combustion, a part of the fuel injected into the cylinder at the last stage of the intake stroke is likely to adhere to the cylinder bore. The fuel adhered to the cylinder bore at a relatively low temperature is less likely to be vaporized and discharged as unburned fuel components. Meanwhile, in the stratified charge combustion, as the fuel is injected into the cylinder at a latter half of the compression stroke, the injected fuel is less likely to adhere to the cylinder bore. Since discharge amount of the resultant unburned fuel components is smaller than that of the uniform combustion, the stratified charge combustion is more effective for the engine start-up in view of the exhaust emission. As the stratified charge combustion requires less fuel than the uniform combustion, it is further advantageous in view of fuel efficiency.

The fuel injection according to the invention as described above, for example according to any of the timing charts illustrated in FIGS. 3–5, is controlled by an electronic control unit (ECU) 100, illustrated in FIG. 1. The ECU includes, for example, a CPU, ROM, RAM, input and output interfaces, and is coupled (electrically) to the fuel injectors 2 and spark-plugs 1 of each cylinder, as well as to other components of the vehicle, as can be readily appreciated by one skilled in the art.

In the illustrated embodiment, the controller (the electronic control unit 100) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An in-cylinder injection spark-ignition internal combustion engine comprising a plurality of cylinders, a catalyst device disposed in an exhaust system of the engine, and a controller that causes fuel to be injected in a first mode to at least one selected cylinder, and subsequently causes the fuel to be injected in a second mode to all cylinders to be operated, wherein the at least one selected cylinder is selected from the plurality of cylinders to be operated for low fuel pressure during start-up in the first mode, the controller causes a shift from the first mode to the second mode before a completion of a warm-up control of the catalyst device, and starts the all cylinder operation and the warm-up control for all cylinders to warm up the catalyst device disposed in the exhaust system of the engine when a fuel injection pressure exceeds a target value.

2. An in-cylinder injection spark-ignition internal combustion engine according to claim 1, wherein the low fuel pressure during start-up occurs when a fuel pressure in an accumulator is less than a predetermined pressure to inject a required fuel amount to all of the plurality of cylinders.

3. An in-cylinder injection spark-ignition internal combustion engine according to claim 1, wherein the controller sets a variable of warm-up control to the catalyst device for the at least one selected cylinder to be smaller than that used when all cylinders are operated, and the at least one selected cylinder is less than all of the cylinders.

4. An in-cylinder injection spark-ignition internal combustion engine according to claim 3, wherein the warm-up controlled variable is an air-fuel ratio of a mixture which is controlled to a lean state.

5. A method of controlling fuel injection in an in-cylinder injection spark-ignition internal combustion engine comprising a plurality of cylinders and a catalyst device disposed in an exhaust system of the engine, the method comprising:

injecting fuel during a first mode to at least one selected cylinder selected from the plurality of cylinders to be operated for low fuel pressure during start-up; and subsequently injecting the fuel during a second mode to all cylinders to be operated;

wherein a shift from the first mode to the second mode is carried out before a completion of a warm-up control of the catalyst device, and the all cylinder operation and the warm-up control for all cylinders to warm up the catalyst device disposed in the exhaust system of the engine is started when a fuel injection pressure exceeds a target valve.

6. An in-cylinder injection spark-ignition internal combustion engine according to claim 3, wherein the warm-up controlled variable is a degree of retarding of an ignition timing of the engine.

7. A method according to claim 5, wherein the low fuel pressure during start-up occurs when a fuel pressure in an accumulator is less than a predetermined pressure to inject a required fuel amount to all of the plurality of cylinders.

8. A method according to claim 5, wherein a variable of warm-up control to the catalyst device for the at least one selected cylinder is set to be smaller than that used when all cylinders are operated.

9. A method according to claim 8, wherein the warm-up controlled variable is a degree of retarding of an ignition timing of the engine.

10. A method according to claim 8, wherein the warm-up controlled variable is an air-fuel ratio of a mixture which is controlled to a lean state.

* * * * *